United States Patent [19]
Davis

[11] 3,824,736
[45] July 23, 1974

[54] METHOD AND APPARATUS FOR PRODUCING PLANTS

[75] Inventor: Noel Davis, Russell, Ohio

[73] Assignee: Integrated Development and Manufacturing Company, Chagrin Falls, Ohio

[22] Filed: Jan. 22, 1973

[21] Appl. No.: 325,713

Related U.S. Application Data

[63] Continuation of Ser. No. 87,795, Nov. 9, 1970, abandoned.

[52] U.S. Cl. .................................................. 47/17
[51] Int. Cl. ............................................. A01g 9/24
[58] Field of Search .............. 165/60; 47/1.2, 17, 58

[56] References Cited
UNITED STATES PATENTS

| | | | |
|---|---|---|---|
| 2,244,677 | 6/1941 | Cornell | 47/17 |
| 3,124,903 | 3/1964 | Truhan | 47/17 |
| 3,254,447 | 6/1966 | Ruthner | 47/1.2 |
| 3,276,163 | 10/1966 | Oepen et al. | 47/1.2 |
| 3,324,593 | 6/1967 | Strasser | 47/17 X |
| 3,327,425 | 6/1967 | Dosedla et al. | 47/1.2 |
| 3,348,922 | 10/1967 | Bose et al. | 47/17 X |
| 3,434,530 | 3/1969 | Davis | 165/60 |
| 3,446,272 | 5/1969 | Gaines | 47/17 X |

Primary Examiner—Robert E. Bagwill
Attorney, Agent, or Firm—Fay & Sharpe

[57] ABSTRACT

A method and apparatus for the continuous production of plants. The method comprises moving the plants through a corridor wherein closely controlled conditions of temperature and humidity are maintained. The corridor is preferably formed by a series of modular units each of which inludes an illuminated section and a darkened section. Each modular unit is arranged to constitute one twenty-four hour growth period so that merely by varying the number of modules, growing cycles of any desired duration can be provided.

5 Claims, 4 Drawing Figures

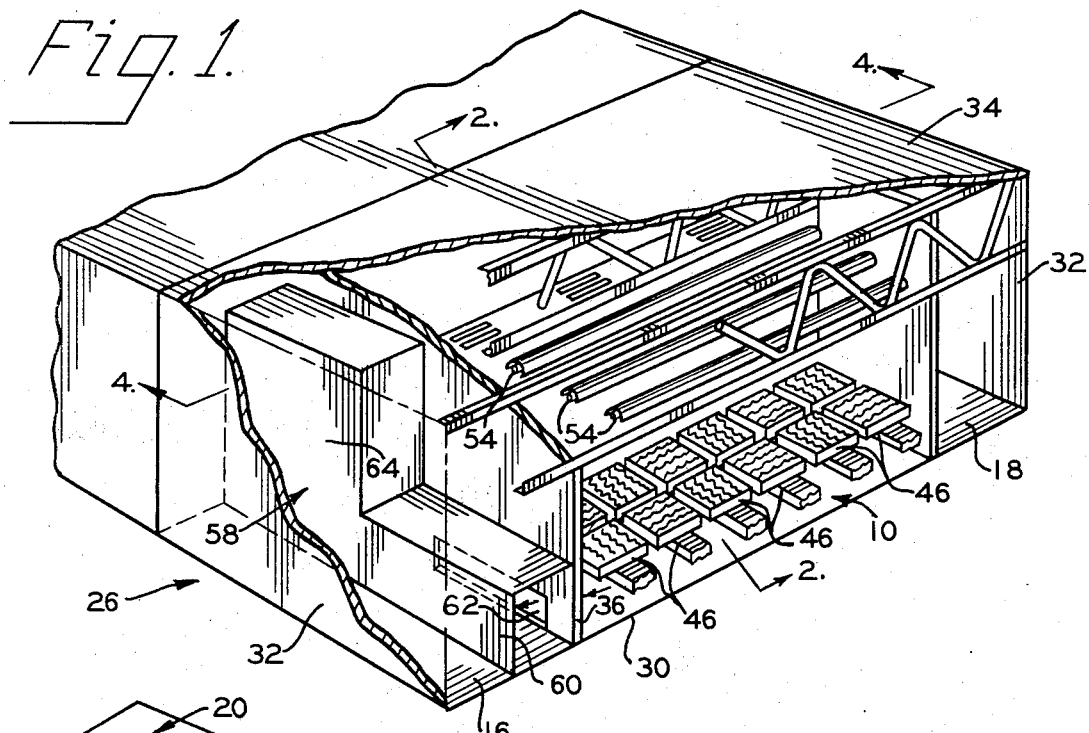
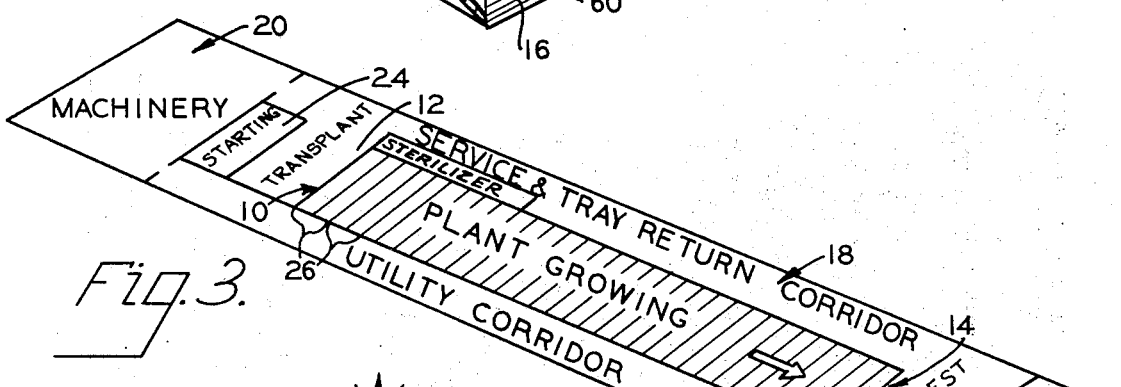
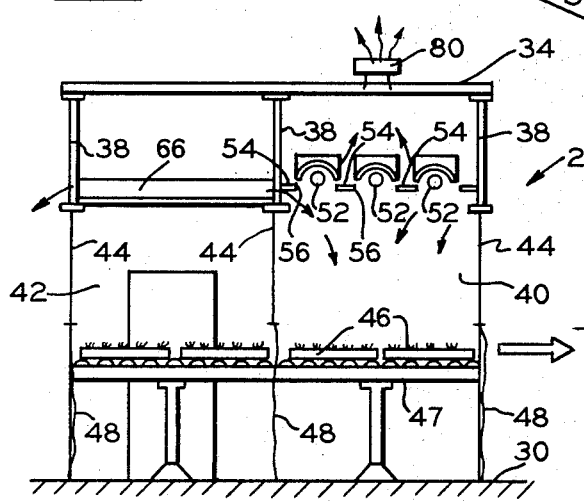

METHOD AND APPARATUS FOR PRODUCING PLANTS

This is a continuation, of application Ser. No. 87,795, filed Nov. 9, 1970, now abandoned.

The subject invention is directed toward the art of environmental growth chambers and, more particularly, to an improved method and apparatus for continuous production of plants.

The invention is especially suited for producing food plants such as bib lettuce and will be described with particular reference thereto; however, it will be appreciated the invention is capable of broader application and could be used for continuous production of many varieties of plants.

In the past, it has been very difficult for food crops grown in a controlled environment to compete on an economic basis with farm grown plants. This has been particularly true in the colder climates where heating requirements generally far exceed the transportation costs involved in shipping farm grown plants from a warmer climate. An additional factor has been the capital investment in buildings, machinery and the like for any sizable operation. This factor is further complicated by the fact that each plant variety generally has a different growing period to maturity. Thus, a system built to handle one type of plant is generally not suited for handling a different type of plant.

The subject invention overcomes the above problems and allows plants to be grown in a controlled environment in a manner which makes them competitive with farm grown crops. In accordance with one aspect of the invention, there is provided a method for continuous plant production which includes the steps of:

a. providing a series of modules substantially equal in number to the number of days in the growing cycle of the crop being raised, with each module having light and dark growth chamber portions;

b. starting the plants in a chamber under controlled conditions of temperature, illumination, humidity, feeding, and watering;

c. transferring the plants to a first module of said series wherein the plants are subjected to predetermined periods of light and darkness;

d. sequentially transferring the plants through said series of modules at a predetermined rate so that the plants are continually subjected to controlled environmental conditions with alternate periods of light and darkness, the total number of modules through which the plants are transferred being substantially equal to the number of days in the drowing cycle of the plants.

In accordance with a second aspect of the invention, the modules preferably comprise a floor, a pair of end walls and a roof connected between the end walls with internal partitions extending between the floor and the roof generally parallel to the end walls to divide the module into three longitudinally extending chambers. The center chamber is preferably larger than the other two chambers and constitutes a controlled environment growth chamber. Dividers extend between the internal partitions to divide the center chamber into two growth chamber portions. One of the growth chamber portions is provided with lamps for maintaining a high level of illumination therein. A conveyor is provided for carrying plants between the growth chamber portions and temperature control means function for supplying conditioned air to at least the illuminated portion of the center chamber.

By using the method and apparatus described above, it is possible to vary any one installation so that it can handle many different types of plants. Merely by adding or removing modules, substantially any plant growth cycle can be accommodated. Further, the output of the system is continuous allowing automation of the handling systems. Additionally, since each module is constructed in the manner described, it is relatively inexpensive.

Accordingly, a primary object of the invention is the provision of a method and apparatus which can be used to economically produce food plants.

A further object is the provision of a system of the type described which is extremely flexible and can readily be modified to meet the growth cycle needs for a variety of plants.

Yet another object is the provision of a growth chamber apparatus having both light and dark chamber portions with an improved air distribution system incorporated therein.

Yet another object is the provision of a system of the type described that is simple to build and economical to operate.

These and other objects and advantages will become apparent from the following description when read in conjunction with the accompanying drawings wherein;

FIG. 1 is a pictorial view with portions broken away showing the interior arrangement of one of the modules used for carrying out the inventive method;

FIG. 2 is a cross-sectional view taken on line 2—2 of FIG. 1 to more clearly show the air flow and internal arrangement of the chambers;

FIG. 3 is a diagramatic layout of a typical plant factory utilizing the invention; and, FIG. 4 is a cross-sectional view taken on line 4—4 of FIG. 1.

Figure 4:
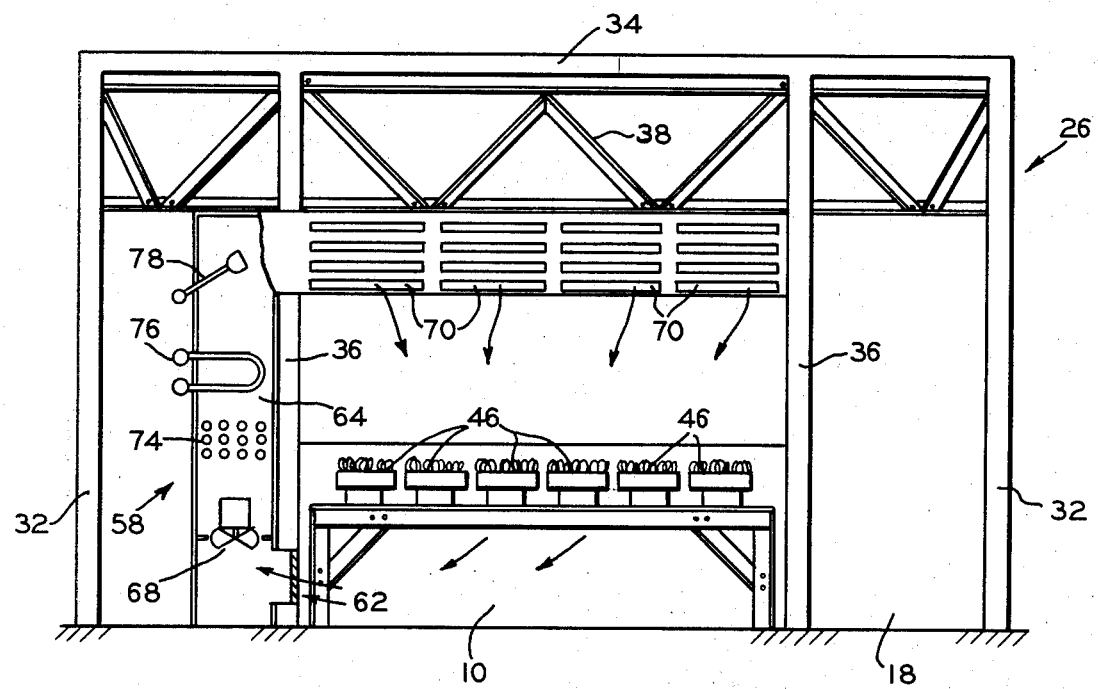

As can be readily understood, many different structural arrangements could be used for carrying out the method aspects of the invention. The preferred arrangement can best be understood by reference to FIG. 3 which, as noted above, shows in diagramatic fashion a plant factory setup arranged for the continuous production of food plants and including an elongated, enclosed plant growing corridor 10. The growing plants are continuously conveyed through the corridor 10 from the inlet end 12 to the outlet end 14 where they are then harvested. Preferably, along each side of the enclosed plant growing corridor 10 there are separate, enclosed corridors 16 and 18 adapted for use, respectively, as a utility corridor for housing the various temperature control equipment and as a service corridor for returning the growing trays or flats to the inlet end 12. Additionally, it should be understood that chilled water, steam or the like necessary for the various temperature control equipment, is preferably supplied from a common machinery room 20 which houses the boilers, compressors and similar equipment. Adjacent the outlet end of the plant growing corridor, there is preferably a cold storage room 22 for storing the crops. Also, an office and shipping area are desirably located at this end of the factory.

According to the preferred aspects of the invention, the method of factory production of plants comprises starting the plants in a first controlled environment chamber or room 24 and allowing them to reach a predetermined size suitable for transplanting. Thereafter, they are transplanted to growing trays of a size convenient for handling and then transferred to the plant growing corridor 10. According to the invention, the corridor 10 is formed from a series of modules 26 which are interconnected to form a continuous enclosed growing corridor. Preferably, each of the modules 26 is arranged to provide a predetermined period of darkness followed by a period of illumination. The modules are serially interconnected so that as the plants are moved through the corridor 10, they are subjected to alternate periods of light and darkness. Preferably, the modules are equal in number to the number of days in the plants' growing cycle [i.e., the elapsed time from transplanting until they are ready for marketing]. As the plants are moved through the corridor, such as by the roller conveyor 47, they are maintained in a controlled environment to provide the most ideally suited growing conditions of temperature, humidity and light. Generally, the periods of light and darkness would each be approximately 12 hours duration with the plants either being moved continuously at a rate so that they were in each of the light and dark zones for equal periods of time or, alternately, they can be moved once during each 12 hour period. It should be appreciated that the most suitable ratio of light to darkness may vary depending upon the type of plants being raised.

Clearly, many different types of structures could be used for providing the necessary growing corridor; however, in accordance with an aspect of the invention, the individual modules 26 are preferably formed as best illustrated in FIGS. 1, 2 and 4. As shown therein, each module includes a floor 30 which can be merely a permanently installed concrete slab or a light weight floor constructed in the manner of the vertically extending walls 32. The module 26 also has a closed roof 34 which extends between the vertically extending end walls 32. As shown in FIGS. 1 and 4, the roof is supported from end walls 32 by suitable beams or the like 36.

Preferably, a pair of inner partitions 36 extend generally parallel to the end walls 32 and divide the module into three transversely extending corridor sections. As shown, the corridor sections correspond to the growing corridor 10, the utility corridor 16 and the service corridor 18 illustrated in FIG. 3. Although the provision of three separate corridors is preferred, it should be appreciated that the service and utility corridors could be combined or provided in a separate module.

The outer walls and roof 32, 34 do not have to be particularly well insulated; however, the internal partition walls 36 are preferably formed in a manner to well insulate the growing corridor area 10. For example, the walls 36 could be a sandwich construction of plastic foam insulation and sheet aluminum to provide good insulating qualities and light weight.

In the transverse direction, as illustrated in FIG. 2, the growth corridor 10 is preferably divided into a light or illuminated section 40 and a dark or low illumination section 42. This division is accomplished by light weight partitions 44 which extend downwardly from the beams 38 to a position closely above the path of travel of the plant trays 46. As will hereafter be discussed, flexible curtains or sheets 48 preferably extend from the lower edges of the partitions 44 to a location closely above the floor 30.

The temperature and humidity levels within the sections 40 and 42 are maintained at closely controlled levels. Also, in section 40 a high level of illumination is maintained. For this reason, a plurality of lamps 52 extend across the chamber at a location spaced downwardly slightly from the roof 34. The particular type and number of lamps used is not of importance however, the lamps in the embodiment shown are high intensity lamps and positioned with their housings a slight distance apart so that air can flow between the lamps for cooling in a manner subsequently to be described. Additionally, baffle plates 54 extend between the lamps to leave small openings 56 closely adjacent each lamp.

Conditioned air is supplied to the module from an air handler unit 58 mounted in the utility corridor section 16. The air handler 58 could take many forms but is shown as a pair of rectangular, sheet metal housings including a first duct section 60 positioned exteriorly of the partition wall 36 adjacent the illuminated section of the growth corridor 10 and a second section 64 positioned adjacent the dark section of the corridor. An air inlet opening 62 is formed through wall 36 to allow air communication from the illuminated section to the second section 64. A rectangular air plenum or supply duct 66 extends outwardly from the top of the section 64 and across section 42 of the module. It should be appreciated that by enclosing the ceiling of the darkened section with the air plenum, it is not necessary to insulate the upper portion of the chamber.

Means are provided for continuously withdrawing air from the illuminated section through the opening 62. These means could take many forms but are shown [see FIG. 4] as fans 68 positioned across the air handler section 64 at approximately the level of the top of section 60. The fans are continuously driven to maintain a steady flow of air from the illuminated section through the air handler 58 to the discharge or air supply duct 66.

As best shown in FIGS. 2 and 4, the air plenum or supply duct 66 is provided with outlet dampers 70 arranged to direct the air laterally from the plenum 66 downwardly into the illuminated section of the module. Note that as shown in FIG. 2, each side of the duct 66 is provided with the outlet openings 70 so that when a series of the modules 26 are positioned adjacent one another, the illuminated sections are supplied with air from each side. That is, each air duct 66 supplies air not only to the illuminated section of its own module but also to the next adjacent module. It should also be understood that water cooling of the lamps or the lamp chamber area could be used if desired.

As the air is conducted upwardly through the air handling section 64, it is conditioned to bring it to the proper levels of temperature and humidity. The particular type of conditioning means utilized could take many forms such as shown, for example, in my U.S. Pat. Nos. 3,416,328 and 3,434,530. In the subject embodiment, a cooling coil assembly 74 extends across the section 64 immediately above the fans and functions to cool or dehumidify the air to any desired level. Immediately thereafter is a heating coil unit 76 for raising the air to a desired level. The heating unit 76 can take any form such as, for example, standard finned tube heat exchangers through which hot water or the like is circulated. A humidifying nozzle is positioned downstream in the direction of the air flow from the heating arrangement 76 for raising the air's humidity to any desired level. In many installations, sufficient humidification of the air will be provided by the plant sprinkling system. For example, each illuminated area includes means for sprinkling the plants. This added moisture will normally be sufficient to maintain the air properly humidified.

It should be understood that the necessary service supply of heated water, chilled water, steam or the like, is preferably supplied to all modules from a common source. Individual modules or groups of modules could be supplied from independent sources.

As can be appreciated, the presence of a large number of lamps in the illuminated chamber section 40 can unduly affect the temperature level therein. For this reason, means are provided for cooling the lamps and withdrawing the heat generated thereby. Many types of lamp cooling arrangements could be utilized; however, in the disclosed embodiment, the lamp cooling arrangement comprises a roof fan or ventilator 80 positioned above the lamps and arranged to withdraw a small amount of the air supplied through duct 66. As can be seen, a portion of air from the illuminated chamber 40 is conducted upwardly through the slots 56 adjacent the lamps 54 and discharged from the module. Generally, by withdrawing approximately ten percent of the air supplied to the chamber the necessary cooling can be effected.

The particular manner in which the modules are interconnected to form the continuous growth corridor is not of importance. However, it should be appreciated that since each module is substantially self-contained, the entire system can be readily adapted for any plant growth cycle. Merely by adding additional modules to the assembly, any number of growing days can be provided. Thus, the invention is extremely flexible and efficient use of the equipment is assured.

The invention has been described in great detail sufficient to enable one of ordinary skill in the art to make and use the same. Obviously, modifications and alterations of the preferred embodiment will occur upon a reading and understanding of the specification and it is my intention to include all such modifications and alterations as part of my invention insofar as they come within the scope of the appended claims.

What is claimed is:

1. A system for providing controlled environmental conditions for growing plant crops comprising:
   a. a series of individual modules serially joined together to form an elongated plant growing corridor, with the number of modules in such series being substantially equal to the number of days in the growing cycle of the crop being raised, each of said modules being comprised of first and second chamber portions only one of which is provided with lamp means for maintaining a predetermined level of illumination in said one chamber, said chamber portions being separated by divider means adapted to screen the light from the other of said chambers for maintaining darkness therein, a portion of said divider means being constructed and arranged in said module so as to permit the movement of plants through said chambers,
   b. a continuous conveyor passing sequentially through said series of modules and means for driving said conveyor, said conveyor being adapted to convey plants at a predetermined speed through said modules thereby exposing said plants to alternate periods of light and darkness for their entire growth cycle, and
   c. means for supplying conditioned air to at least said illuminated chamber for maintaining predetermined temperature conditions therein.

2. The system of claim 1 wherein said means for supplying conditioned air includes temperature control means associated with said modules for regulating the temperature of the conditioned air supplied thereto, and further including air recirculation means for supplying conditioned air to the upper portion of said illuminated chamber and withdrawing air from the lower portion thereof.

3. The system of claim 2 wherein said air recirculation means comprises a plenum chamber positioned in the top of said other chamber, said plenum chamber being provided with outlet dampers on the opposite sides thereof communicating with the illuminated chambers on either side of said other chambers.

4. The system of claim 1 wherein each of said modules includes a floor, a pair of end walls and a roof connected between said end walls, internal partition means extending between said floor and said roof generally parallel to said end walls to divide said modules into three chambers, the center chamber being larger than the other two chambers and constituting a section of said growing corridor.

5. The system of claim 4 wherein said other two chambers constitute utility and service corridors, and wherein said means for supplying conditioned air includes temperature control means located in said utility corridor.

* * * * *